United States Patent [19]

Welch et al.

[11] Patent Number: 5,456,542
[45] Date of Patent: Oct. 10, 1995

[54] ADJUSTABLE DATA ENTRY KEYBOARD

[75] Inventors: Harold Welch, San Jose; Stephen Peart, Los Gatos; Matthew Herron, Menlo Park; David Shen, Cupertino; Ray Riley, San Jose; Andrew L. Carter, Saratoga; Robert A. Howard, Mountain View; Dexter Francis, Los Altos; David Nguyen, Sunnyvale, all of Calif.

[73] Assignee: Apple Computer, Inc., Cupertino, Calif.

[21] Appl. No.: 3,243

[22] Filed: Jan. 11, 1993

Related U.S. Application Data

[63] Continuation-in-part of Ser. No. 782,004, Oct. 22, 1991, Pat. No. 5,209,134.

[51] Int. Cl.$^6$ ............................................. B41J 5/10
[52] U.S. Cl. .................................. 400/492; 235/146
[58] Field of Search ............................ 400/472, 489, 400/492; 235/145 R, 146

[56] References Cited

U.S. PATENT DOCUMENTS

| | | | |
|---|---|---|---|
| 4,597,681 | 7/1986 | Hodges | 400/489 |
| 4,604,751 | 1/1986 | Alley et al. | 235/146 |
| 4,661,005 | 4/1987 | Lahr | 400/489 |
| 5,067,834 | 11/1991 | Szmanda et al. | 400/489 |
| 5,122,786 | 6/1992 | Rader | 400/492 |
| 5,156,475 | 10/1992 | Zilberman | 400/472 |

FOREIGN PATENT DOCUMENTS

| | | | |
|---|---|---|---|
| 8503035 | 7/1985 | WIPO | 400/489 |

*Primary Examiner*—Eugene H. Eickholt
*Attorney, Agent, or Firm*—David J. Larwood

[57] ABSTRACT

An integrated adjustable data entry keyboard. A divided keyboard arrangement comprises first key field and second key fields pivotably mounted upon a stationary base. The first and second key fields substantially comprise a keyboard arrangement. A space bar is separately attached to the base and occupies a lower keyboard region centrally disposed between the first and second key fields. The space bar is enlarged so as to remain within the radius of a user's thumb's "strike zone" when a user adjusts the first and second key fields. A synchronizing coupling means may be employed to ensure complimentary movement of the first key field relative to the second key field and thereby relative to the user's hands and wrists, even if only one of the individual key fields is pivoted. Compliantly mounted detachable palm rests may be attached to each of the first and second key fields to provide substantially integrated palm and hand support for the user throughout the range of motion of the key fields, thereby increasing the user's comfort.

17 Claims, 9 Drawing Sheets

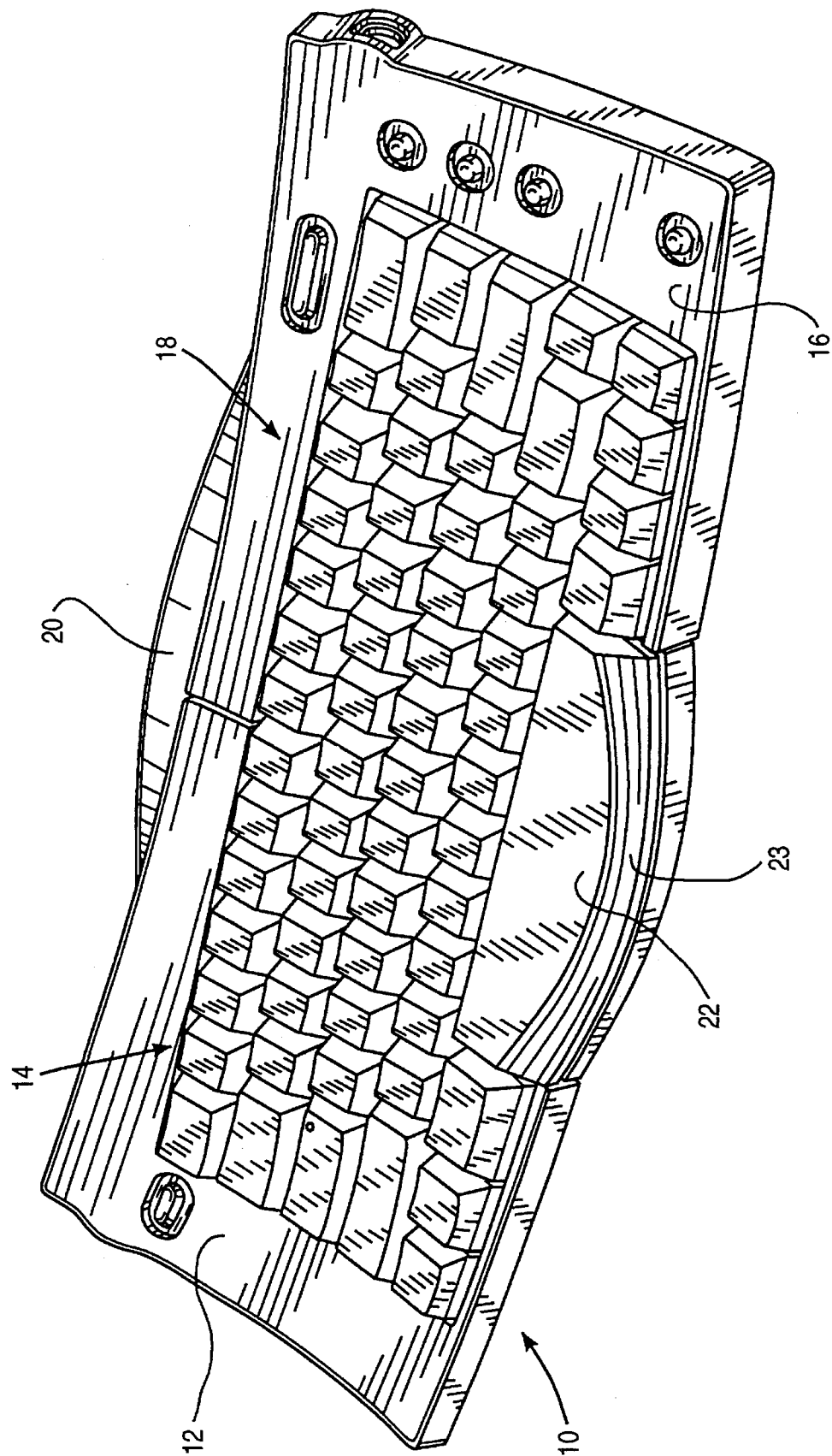
FIG_1

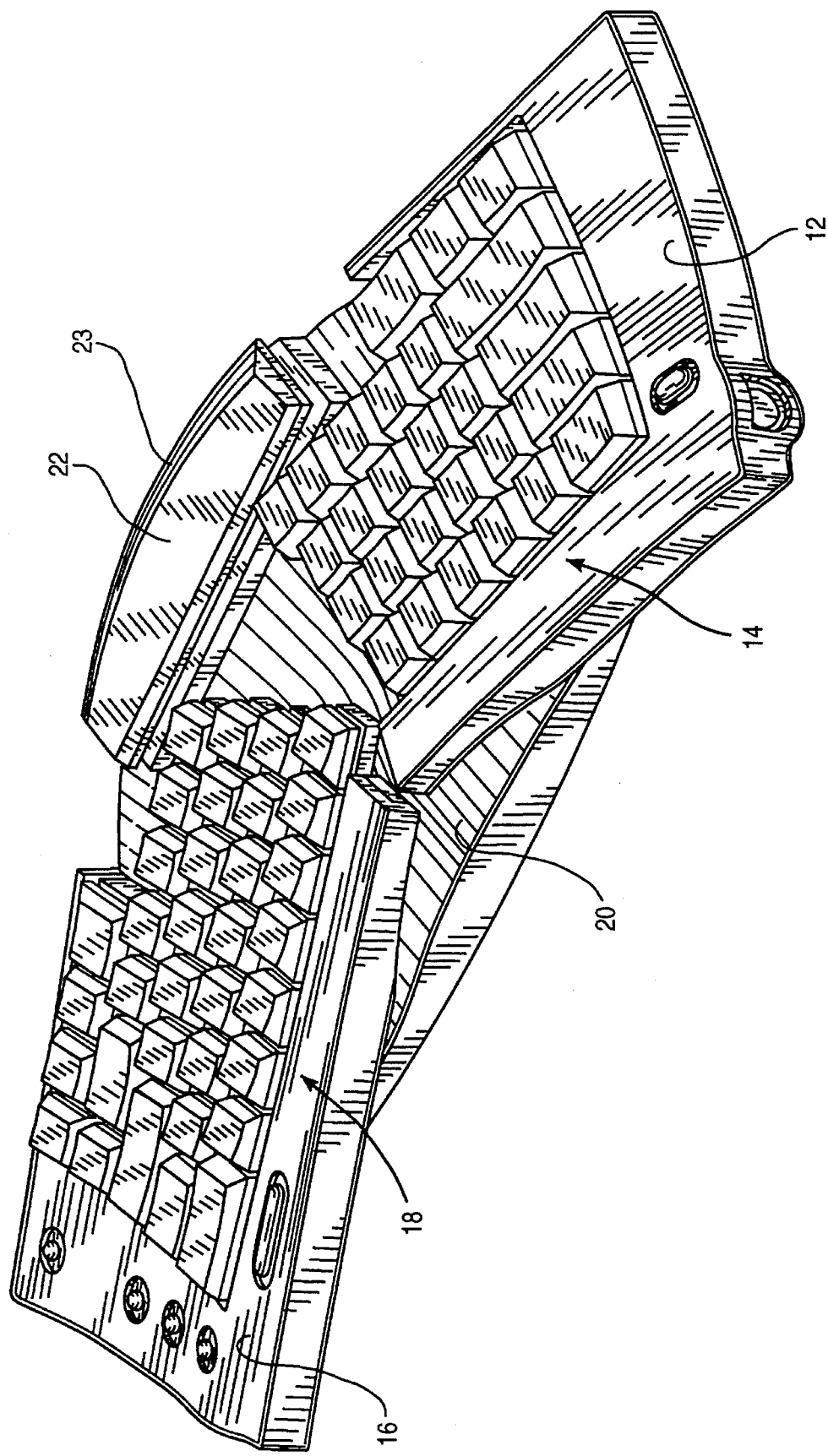
FIG_2

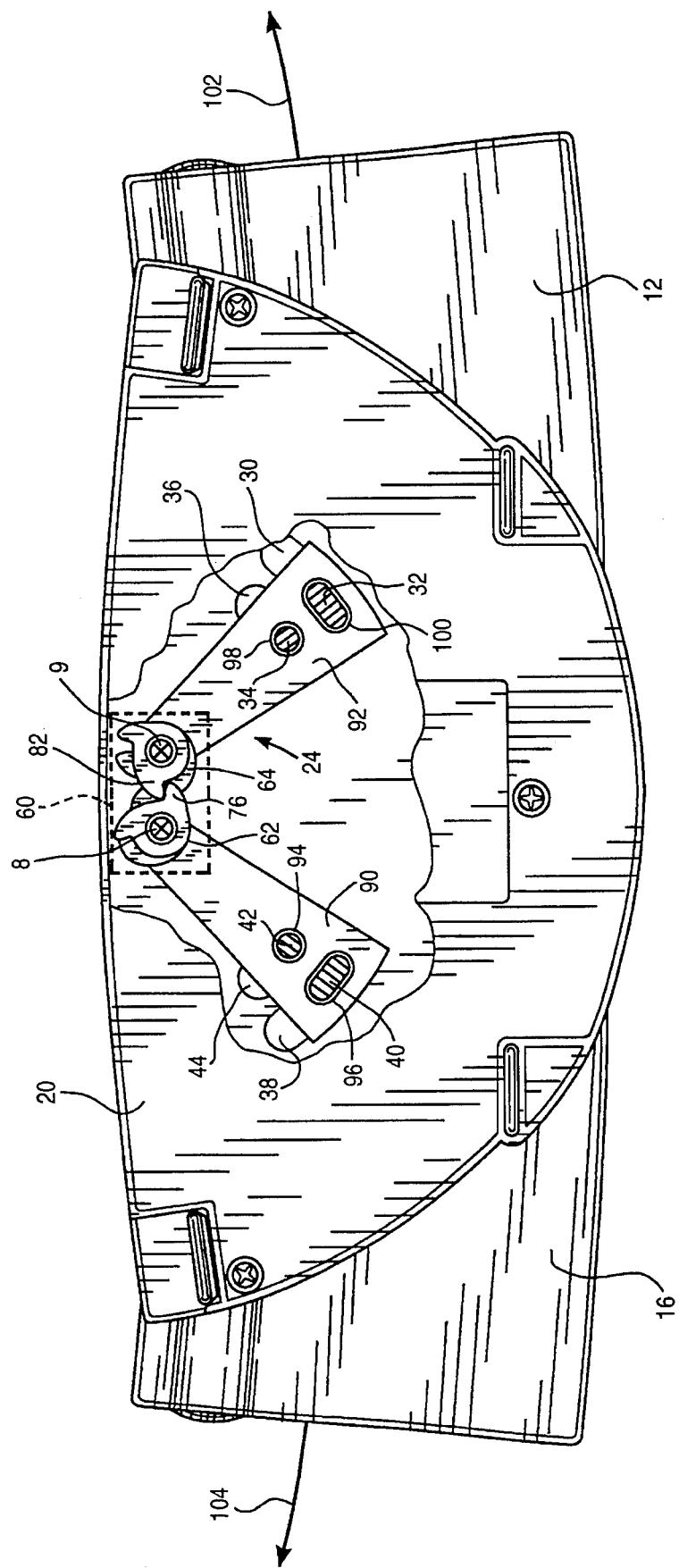
FIG_3

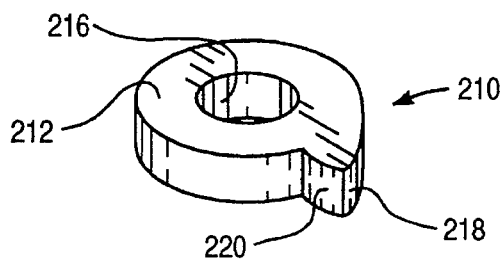
FIG_4
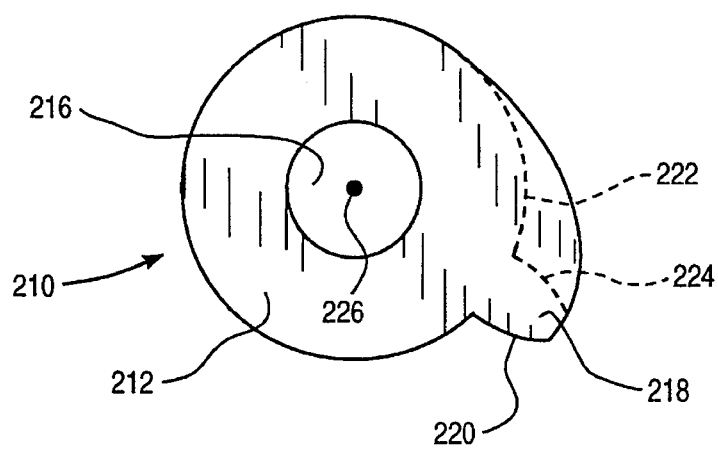
FIG_5
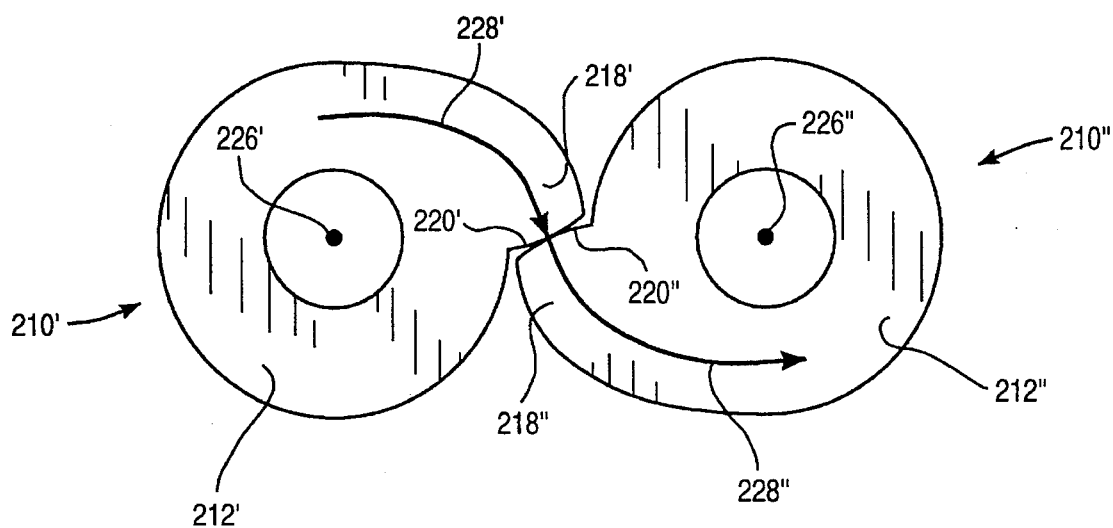
FIG_6

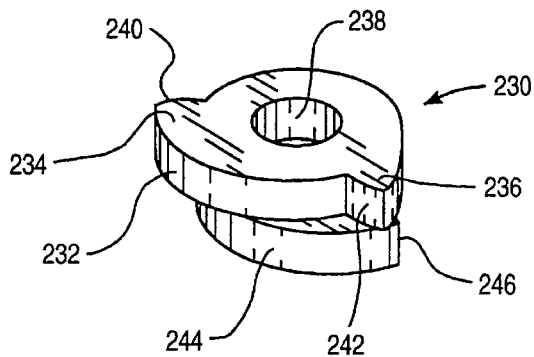
FIG_7
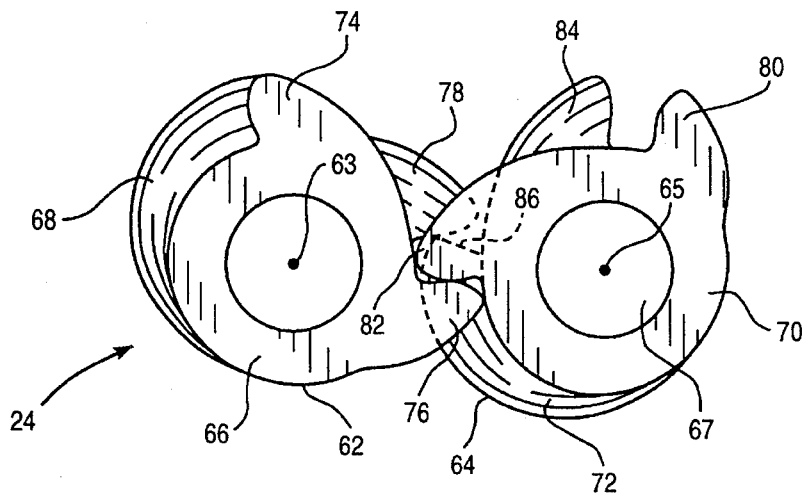
FIG_8A
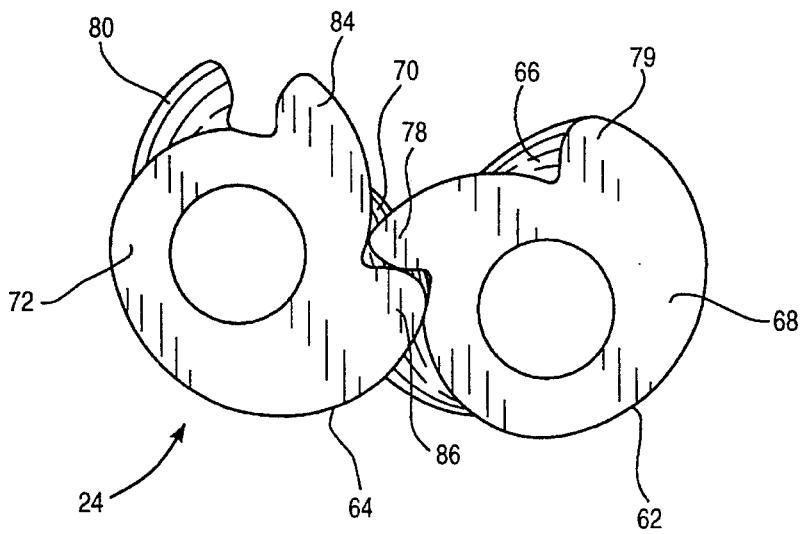
FIG_8B

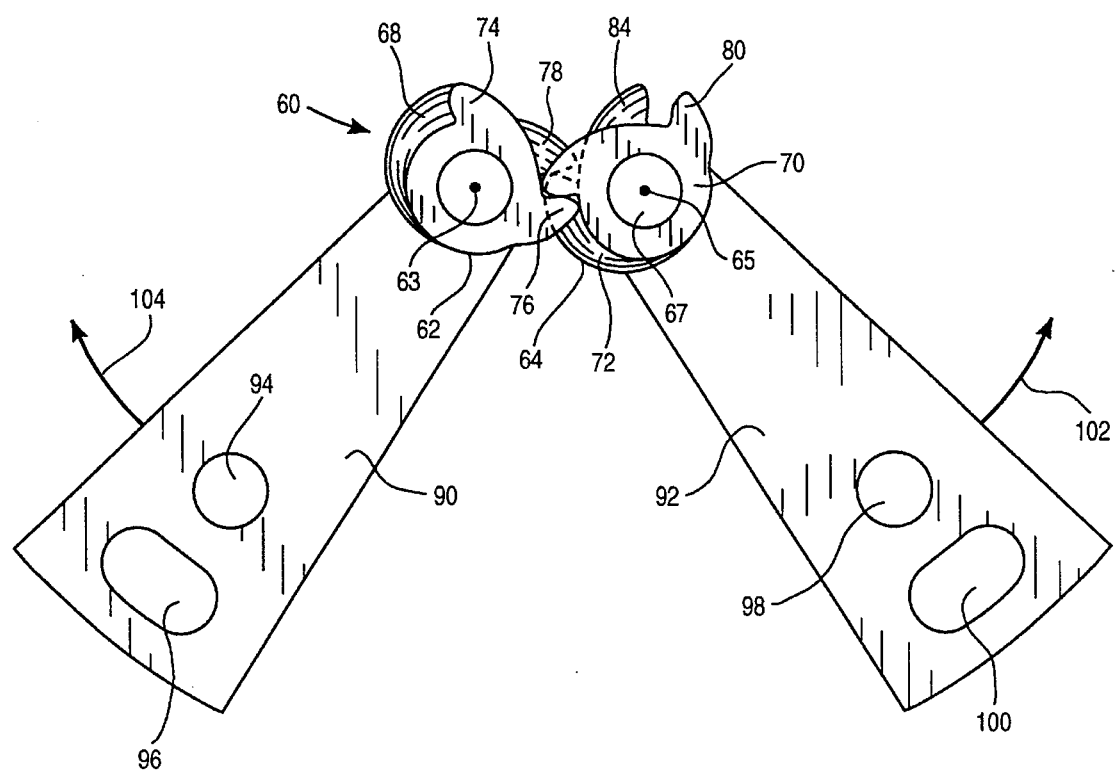
FIG_9

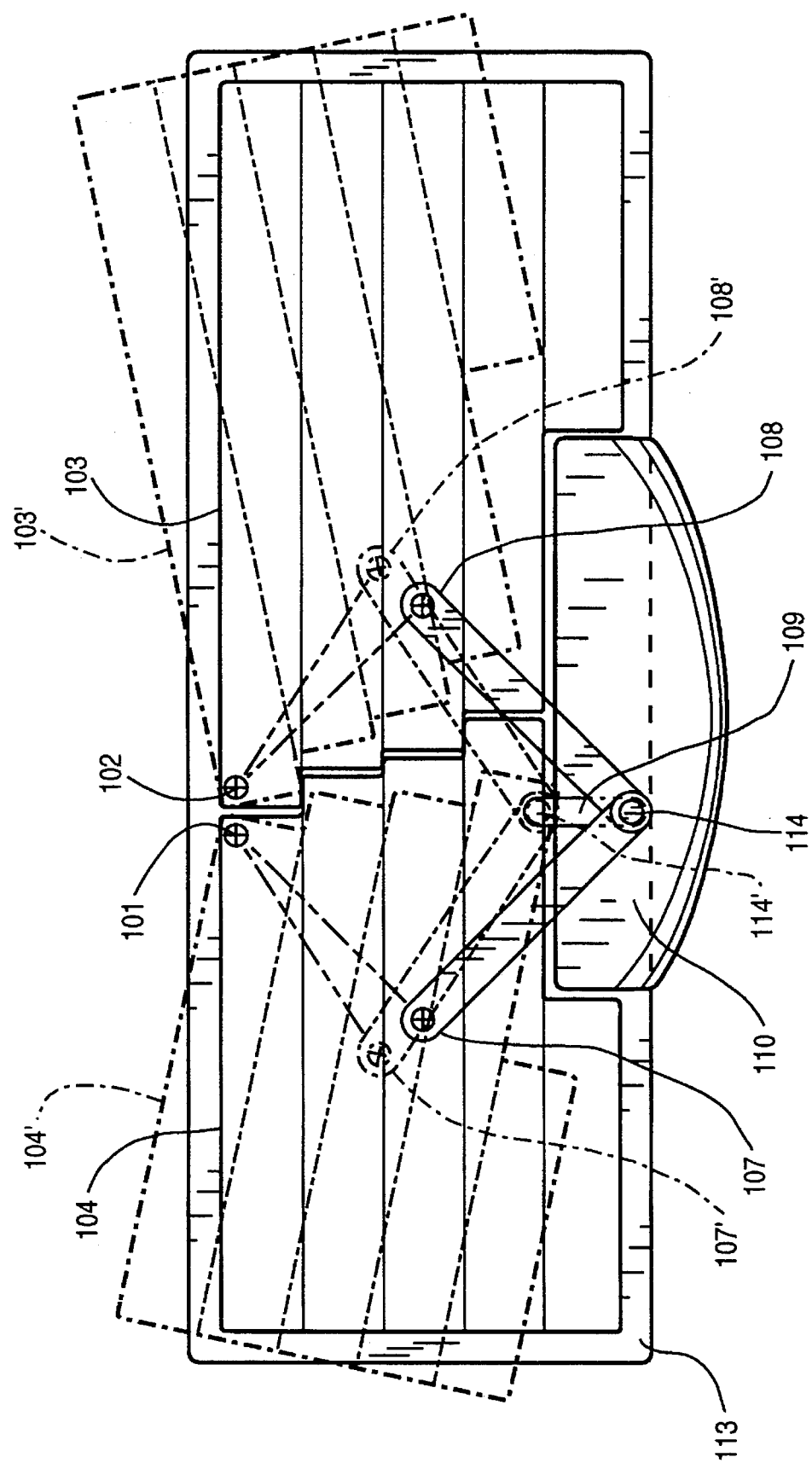
FIG_10

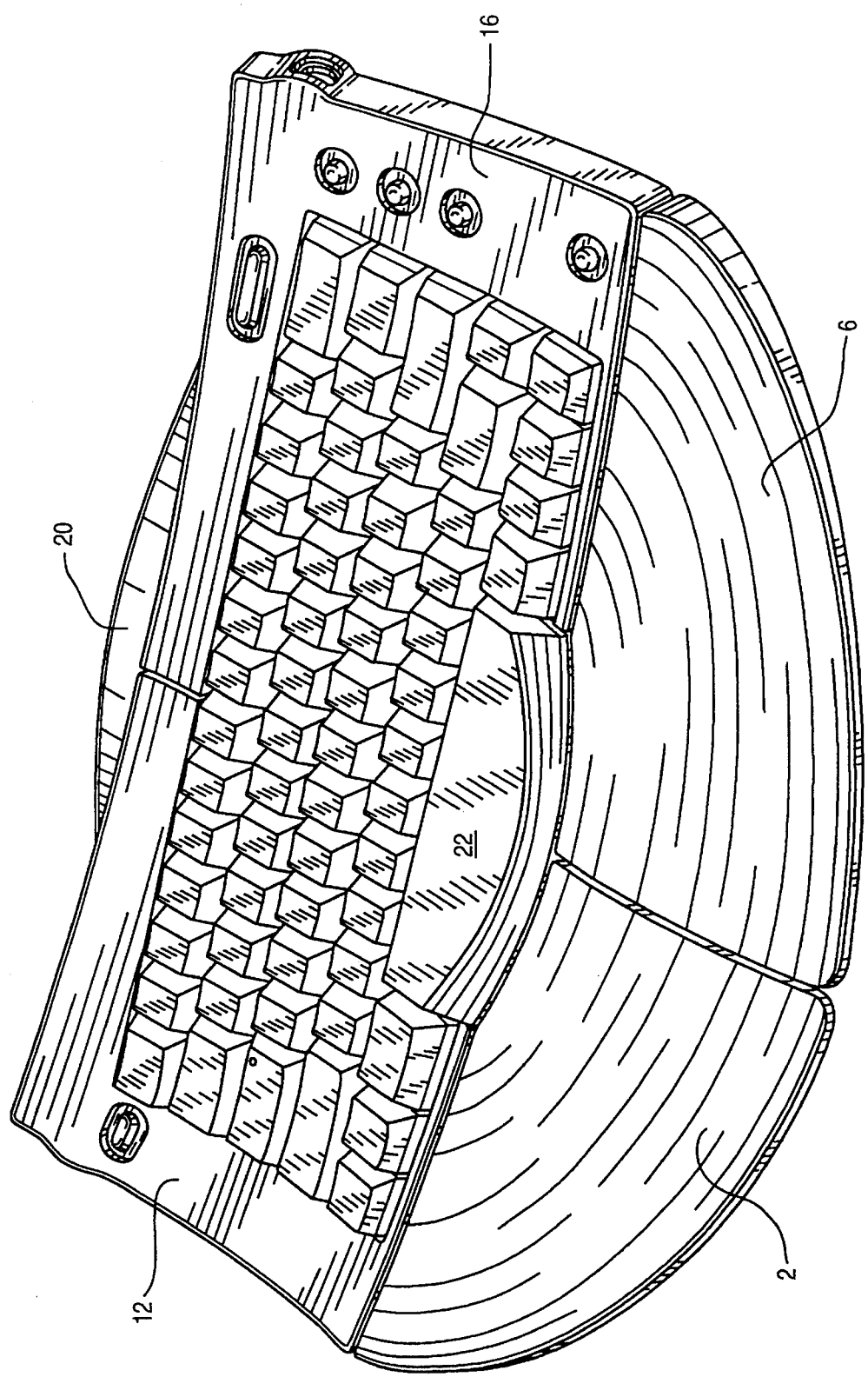
FIG_11A

ADJUSTABLE DATA ENTRY KEYBOARD

RELATED APPLICATIONS

The present invention is a continuation-in-part application of U.S. patent application Ser. No. 07/782,004, filed Oct. 22, 1991, now U.S. Pat. No. 5,209,134, and entitled "Synchronous Gearing Mechanism with High Strength, Limited Rotation Gear Profile".

BACKGROUND OF THE INVENTION

1. Field of the Invention

The present invention relates generally to data entry keyboards, and more specifically to an adjustable keyboard with adjustable divided key fields synchronized by a synchronous gearing mechanism.

2. Art Background

Since the advent of the "standard keyboard" employed in ordinary typewriters, various modifications have been made to simplify the mechanics and improve the human factors of keyboard use. Such modifications have included altering either the arrangement of keys or changing the overall structural design, or both. For example, in German laid-open description No. 27 25 677 to Muther, entitled "Tastatur fuer Schreibmaschinen (Typewriter Keyboard)", an alternative arrangement of key order and placement is disclosed wherein improved typing speed can be achieved by placing the most frequently struck keys at the "home" position for the eight typing fingers. The keyboard of Muther is a unitary key field distributed in a fixed base, where the keys are arranged in wave-like rows.

In U.S. Pat. No. 4,597,681 to Hodges, entitled "Adjustable Keyboard", a keyboard arrangement is disclosed wherein two sets of keys can be pivoted and tilted, as well as having adjustable keycaps to achieve a comfortable typing position for a user. In Hodges, the sets of keys are contained within two hingeably attached baseplates positioned within an underlying support plate. However, the sets of keys in the Hodges keyboard must be separately adjusted in both the pivoting and tilting dimensions, and the complex construction of the adjustable keycaps can significantly increase the cost of manufacture of the keyboard.

In U.S. Pat. No. 5,067,834 to Szmanda et al., entitled "Input Keyboard Apparatus for Information Processing Device and Other Keyboard Devices", an adjustable keyboard is disclosed wherein two sets of keys can be pivoted and tilted to a comfortable position for the user. In Szmanda, a universal pivot point and a pair of telescoping members are used to articulate and support the keyboard arrangement in a desired position. As in the Hodges patent, the sets of keys in the Szmanda keyboard must be separately adjusted in both the pivoting and tilting dimensions.

Due to the nature of the articulating and adjusting hardware components used in recent "improved" keyboard designs, such keyboards may be less attractive to users from both cost and convenience considerations. Depending upon the working height of the keyboard, as the key fields of the articulating keyboards of Hodges and Szmanda become substantially elevated above the work surface, a user may experience discomfort if the palms and forearms of the user are not supported.

Moreover, existing adjustable keyboards comprising two key fields treat the space bar in one of two ways. First, the space bar may be "split" into two portions as taught by Hodges, with each key field containing one of the two space bar portions. Second, an elongated, full-sized space bar fixed relative to one of the key fields is used, and remains fixed relative to one of the key fields comprising the keyboard, generally the right key field, as the keyboard components are repositioned. The foregoing space bar arrangements can produce undesirable results. For example, an open space, or gap, will be created in the region between the separated key fields normally occupied by a "standard space bar when the articulating keyboard is adjusted outward, the gap occurring in the region where the space bar is most commonly struck by a user's thumb. Further, two separated key fields using the two-portion split space bar may also cause the user to become disoriented as to hand or key position. Alternatively, in arrangements using an elongated space bar fixed relative to one of the key fields, the space bar will create an awkward extension when the key fields are articulated outward during use.

As will be described in more detail in the following detailed description, the present invention facilitates a comfortable and easy to use integrated keyboard arrangement comprising a space bar which remains generally centrally disposed between two articulating key fields, which keyboard may be used with data entry or computing devices. Further, the present invention provides for synchronizing means including a synchronizing gear to permit synchronized or complimentary motion between the movable component parts, thereby permitting easy positioning of the separate key fields in an efficient manner relative to the stationary space bar. The synchronizing gear allows transmission of force in only one direction of gear rotation, enabling a gear tooth to be significantly thicker than a prior art gear tooth, and therefore stronger and more reliable.

SUMMARY OF THE INVENTION

An integrated adjustable data entry keyboard provides more comfort and ease of use for typists and users of computer or data entry systems. A divided keyboard arrangement comprising a first key field and a second key field are pivotably mounted upon a stationary base about a pair of pivot axes. The first and second key fields substantially comprise a keyboard arrangement, and permit adjustment of the keyboard according to a user's preference. A space bar is separately attached to the base and occupies a lower keyboard region centrally disposed between the first and second key fields. The space bar is enlarged so as to remain within the radius of a user's thumb's "strike zone" when a user adjusts the first and second key fields, without creating the gap inherent in the prior art devices. A synchronizing means comprising a synchronizing gear embodies a gear profile allowing transmission of force in only one direction of gear rotation, and with a limited range of rotation.

The present gear comprises a modified, asymmetric gear tooth profile, including a pair of teeth having contact faces which are true involutes to prevent speed oscillations across the range of gear motion. By repeating the profiles around the gear minor diameter at large intervals, and by reversing and stacking the gear profiles coaxially, the gearing mechanism is capable of transmitting torque bidirectionally. The synchronizing gear enables a gear tooth to be significantly thicker than a prior art gear tooth, and therefore stronger and more reliable. The synchronizing means may be employed to ensure complimentary orientation of the first key field relative to the second key field, and thereby relative to the user's hand position, even if the user pivots only one of the individual key fields.

Detachable palm rests comprising a compliant attachment means may be attached to each of the first and second key fields to provide substantially integrated palm and hand support for the user, thereby increasing the user's comfort.

BRIEF DESCRIPTION OF THE DRAWINGS

The objects, features and advantages of the present invention will be apparent from the following detailed description with references to the drawings, in which:

FIG. 1 is a perspective view of an integrated adjustable keyboard comprising first and second key fields according to the present invention, arranged in a first, closed position.

FIG. 2 is a perspective view of the integrated adjustable keyboard shown in FIG. 1, illustrating the first and second key fields of the keyboard adjusted to a second, open position.

FIG. 3 is a partially broken bottom plan view of the keyboard shown in FIGS. 1 and 2, wherein a synchronous coupling means comprising a synchronous gearing mechanism in accordance with one embodiment of the present invention.

FIG. 4 is a perspective view of a high strength, limited rotation gear design in accordance with the present invention.

FIG. 5 is a top plan view of the gear in FIG. 4, illustrating a comparison between the present improved gear profile and a traditional gear profile.

FIG. 6 is a top plan view of a gearing mechanism using a pair of high strength gears in accordance with the present invention illustrating the single torque transmission direction.

FIG. 7 is a perspective view of a bidirectional interchangeable gear design in accordance with the present invention.

FIG. 8a is an elevational view of a synchronous gearing mechanism in accordance with the present invention.

FIG. 8b is an elevational view of the synchronous gearing mechanism of FIG. 8a as seen from the opposite planar side from that shown in FIG. 8a.

FIG. 9 is an enlarged view of the synchronous gearing mechanism of the present invention.

FIG. 10 is a bottom plan x-ray view of an alternative embodiment of the present invention, wherein the synchronous coupling means comprises a linkage system.

FIG. 11A is a perspective view of an alternative embodiment of the present invention, comprising compliantly attached palm rests coupled to the first and second key fields, wherein the key fields are in a first, closed position.

DETAILED DESCRIPTION OF THE INVENTION

Figure 11B:
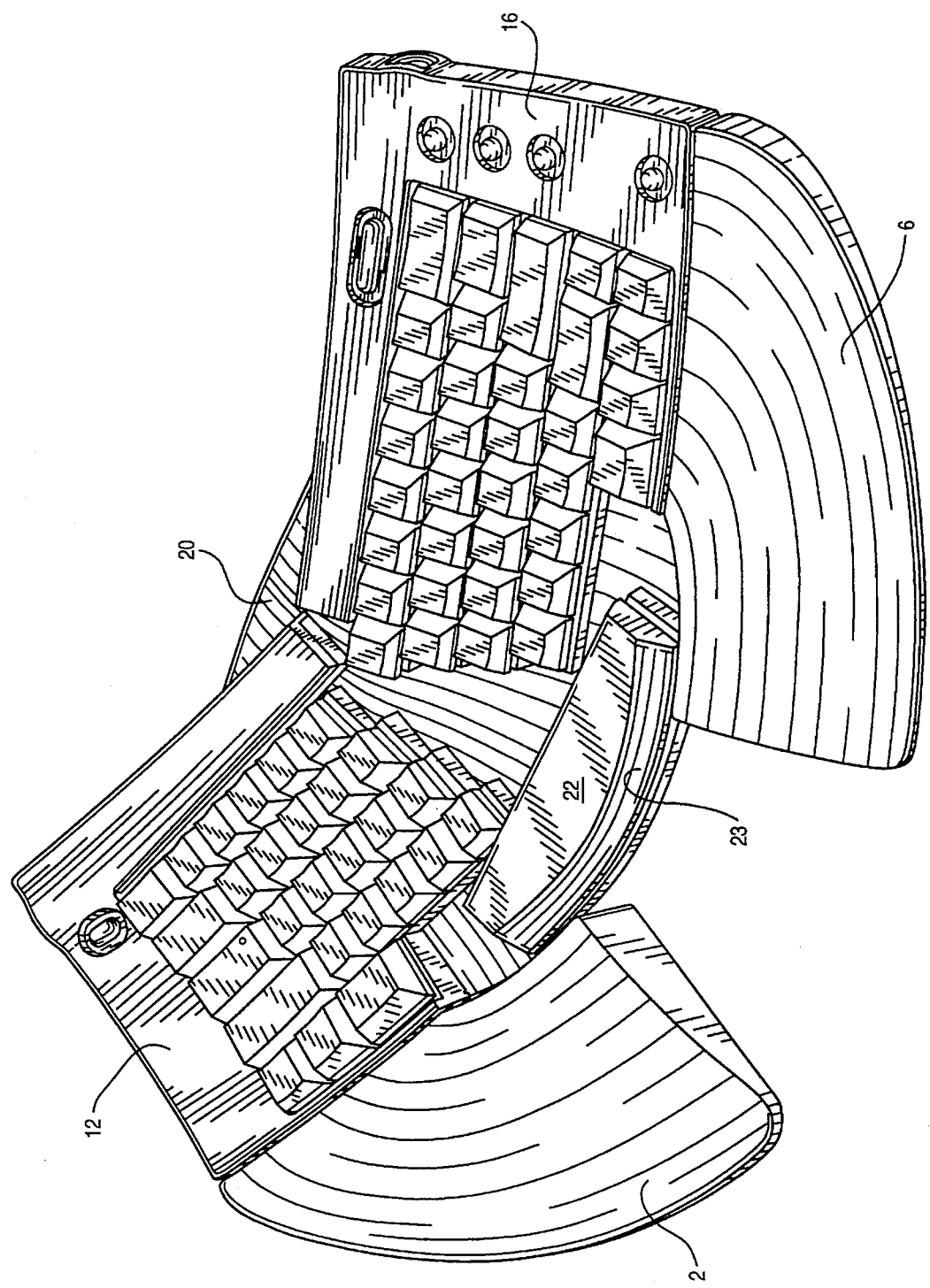
FIG. 11B is a perspective view of the embodiment shown in FIG. 11A, wherein the key fields and palm rests are in a second, open position.

An adjustable keyboard to facilitate comfort and ease of use in data entry and computing devices is disclosed. In the following description, for purposes of explanation, specific numbers, materials, and configurations are set forth in order to provide a thorough understanding of the present invention. However, it will be apparent to one skilled in the art that the present invention may be practiced without these specific details. In other instances, well known systems are shown in diagrammatical or block diagram form in order not to obscure the present invention unnecessarily.

Referring now to FIG. 1, a perspective view of an adjustable keyboard 10 designed in accordance with the the present invention is shown. In FIG. 1, keyboard 10 includes a first half 12 which supports a first key field 14 (shown more clearly in FIG. 2), and a second half 16 which supports a second key field 18 (also shown more clearly in FIG. 2), which key fields 14 and 18 are shown in a first, closed position. First half 12 and second half 16 are pivotably mounted upon a base 20 by a pair of pins (not shown in FIGS. 1–2, reference numbers 8 and 9 in FIG. 3). Pins 8 and 9 are coupled to the first and second halves 12 and 16 at laterally adjacent upper corners, as shown in FIG. 3. First key field 14 and second key field 18 together substantially comprise a standard keyboard arrangement of keys found in a traditional typewriter or computer keyboard. Moreover, first half 12 and second half 16 are movably joined together by a synchronous coupling means comprising a synchronous gearing mechanism 24 (FIG. 3) described in further detail below and forming the subject matter of the above-referenced co-pending application hereto, Ser. No. 07/782,004, entitled, "Synchronous Gearing Mechanism with High Strength, Limited Rotation Gear Profile," by David Nguyen and Dexter Francis.

A space bar 22 is separately positioned within base 20 in a substantially standard keyboard configuration and remains stationary and proportionally positioned between key fields 14 and 18 when key fields 14 and 18 are adjusted relative to the base 20. Space bar 22 is aided in remaining proportionally positioned between key fields 14 and 18 by the above-referenced synchronous gearing mechanism 24, and will be further described below. Space bar 22 is a generally rectangularly shaped keycap with orthogonal top, left, and right edges, and having a sloped bottom edge incorporating an appropriate radius 23. The radius 23 may be chosen so as to nominally position a user's thumb consistently within easy striking distance, i.e., the "strike zone", of space bar 22. Note that unlike other prior art arrangements which follow the convention that the space bar be struck only by the user's right thumb, thereby leading to an offset space bar biased to the right side of the keyboard, the present invention enables a user to equally well use either his right or left thumb to strike space bar 22, at the user's preference.

Referring now to FIG. 2, shown is a reverse angle perspective view of the adjustable keyboard of FIG. 1, with key fields 14 and 18 adjusted to a second, open operational position. As shown, first half 12 and second half 16 have been pivoted outward, away from space bar 22, space bar 22 remaining centrally disposed in a standard keyboard position. Both first half 12 and second half 16 have been rotated a substantially identical amount with respect to base 20 due to the above-referenced synchronous coupling means, implemented as synchronous gearing mechanism 24. As can be seen by reference to the FIG. 2, key fields 14 and 18 have been moved into what is believed to be a more comfortable typing position, wherein a user's hands and wrists are not urged into the more cramped position associated with traditional keyboards. Additionally, space bar 22 remains in a convenient position and eliminates the unwanted gaps characteristic of prior art solutions.

Referring now to FIG. 3, shown is a partially broken bottom plan view of the adjustable keyboard of FIG. 1. As shown in FIG. 3, first half 12 and second half 16 extend laterally beyond the border of base 20 and are coupled to the base by synchronous gearing mechanism 24. As indicated above, synchronous gearing mechanism 24 is described in detail in the above-referenced co-pending parent application and will only be briefly described here. For reference convenience and to facilitate a better understanding of the present invention, reference numerals that are common to the above-entitled co-pending application will be used to indicate the component parts of mechanism 24 in the present application. Synchronous gearing mechanism 24 is essentially a synchronous coupling means for rotatably securing key field 14 and key field 18, carried by half 12 and half 16, respectively, to base 20. Mechanism 24 comprises a bidirectional gearing mechanism 60 which includes substantially identical bidirectional gears 62 and 64. Gear 62 is fixedly secured to or integrally formed with a moment element 90 which extends radially outward from a central axis 63 of the gear, and gear 64 is fixedly secured to or integrally formed with moment element 92 which extends radially outward from a central axis 65 of the gear. As described in detail in the co-pending application, the teeth of bidirectional gears 62 and 64 are meshed together, and each gear is rotatably secured to base 20 at its respective central axis. This enables each of the moment elements to rotate in a clockwise or counter-clockwise direction in essentially synchronous motion relative to one another.

As shown in FIG. 3, first half 12 is coupled to moment element 92 through a first aperture 30 in base 20 by a first connecting means 32. In one embodiment, connecting means 32 is a post which is integrally formed with first half 12 and is securely coupled to element 92 through an aperture 100 in the element. A second connecting means 34 also couples first half 12 to element 92 through a second aperture 36 in base 20. As presently embodied, connecting means 34 is a post which is integrally formed with first half 12 and is securely coupled to element 92 through an aperture 98 in the element. In a substantially similar configuration, second half 16 is coupled to moment element 90 through a third aperture 38 in base 20 by a third connecting means 40. A fourth connecting means 42 also couples second half 16 to element 90 through a fourth aperture 44 in base 20. In the preferred embodiment, third connecting means 40 and fourth connecting means 42 are integrally formed with second half 16 and are securely coupled to element 90 through apertures 96 and 94 in the element, respectively.

In normal operation of the integrated adjustable keyboard shown in FIGS. 1–3, a user will physically rotate either first half 12, second half 16, or both halves at the same time. For purposes of illustration, we will assume that the user rotates first half 12 in the direction indicated by reference arrow 102, that is, outward from base 20 and into the desired typing position. As will be described in detail below, rotation of first half 12 will cause second half 16 to complimentarily rotate outward from the base a substantially identical amount. The complimentary rotation of first and second halves 12 and 16 ensures that the angle bisector of the first and second halves comprising keyboard 10 will always point substantially towards the user, regardless of the total angle subtended between the key fields 14 and 18 due to the rotation selected by the user. Complimentary rotation also ensures that the total angle is adjusted symmetrically even though the user may physically rotate only one of the key fields 14 or 18, thus further ensuring a bilaterally comfortable typing position. In addition, because the angle subtended between first and second halves 12 and 14 is symmetrically maintained between the halves and base 20, the key fields 14 and 18 are thereby urged into symmetrical position relative to space bar 22 mounted to base 20.

When the user rotates first half 12 as described above, moment element 92 is rotated a corresponding amount due to the coupling of the element to half 12 by coupling means 32 and 34. Coupling means 32 and 34 are capable of moving only within the limited range defined by the borders of apertures 30 and 36, respectively. Thus, the confines of these apertures (and those of apertures 38 and 44) define the minimum and maximum range of available motion of first half 12 and second half 16. This has an important advantage of keeping synchronous gearing mechanism 24 within its limited range of operability, and helping to define what is believed to be the nominal range of positions a user would likely find comfortable when positioning key fields 14 and 18. As moment element 92 rotates in the direction of arrow 102, gear 64 is caused to rotate in a counter-clockwise direction. This rotation causes tooth 82 to transmit a torque to gear 62 via tooth 76, thus causing synchronized rotation of gear 62 in a clockwise direction. This clockwise rotation of gear 62 causes moment element 90 to rotate in a clockwise direction. As a result of the coupling between second half 16 and element 90 by coupling means 40 and 42, clockwise rotation of element 90 causes half 16 to rotate outward in the direction of reference arrow 104. Additionally, because the teeth of gears 62 and 64 are meshed, and each gear is secured to base 20 coaxially with respect to its central axis, second half 16 is rotated a substantially identical distance relative to first half 12. Of course, if a user physically rotates second half 16, the same principle as described above would cause first half 12 to rotate a substantially identical distance. This is a result of synchronous gearing mechanism 24 which functionally couples the first and second halves together such that motion of either half in either direction will cause the other half to reposition in a substantially identical manner.

With reference to FIGS. 4–9 collectively, specific elements and features of gears 62 and 64, together with distinctions and advantages over prior art gear systems, will be described. Referring now to FIG. 4, shown is a perspective view of a high strength, limited rotation gear 210 in accordance with the present invention. Gear 210 includes a first substantially planar surface 212 and a second substantially planar surface 214 (not shown) opposite surface 212 and essentially parallel thereto. An aperture 216 is formed through gear 210, perpendicular to opposing surfaces 212 and 214. As is implied by the drawing of FIG. 4, surface 212 and surface 214 are substantially identical to one another. A single gear tooth 218 is integrally formed with gear 210 and includes a single contact surface 220, tooth 218 being asymmetrically disposed with respect to aperture 216.

The asymmetrical nature of tooth 218 is illustrated in FIG. 5 wherein a comparison between the gear profile of the present invention and a traditional gear profile is drawn. A traditional gear border profile 222 (shown in broken line) and traditional gear tooth profile 224 (also shown in broken line) have been included in the FIG. 5 to facilitate this comparison. As shown, the traditional gear is substantially similar to the present gear 210 except for the respective configurations of the gear teeth. The traditional gear tooth profile 224 is radially symmetrically disposed with respect to aperture 216, each side of the tooth being equidistant from a central rotational axis 226. That is, the traditional gear tooth profile 224 includes two oppositely facing contact surfaces 220 and 224, each of which lies approximately the same distance from axis 226. In normal operation, each surface 220 and 224 of the traditional gear tooth contacts a separate tooth of another enmeshed gear and transmits or receives a given amount of torque. This torque may be bidirectionally applied to the tooth at a moment measured from central axis 226 to approximately the center of the contact surface 220 or 224. Further, the bidirectional torque applies stress to the gear at its weakest point, namely where the tooth meets the main body of the gear, and where the least amount of material is available to provide structural support. By comparison, tooth 218 formed in accordance with the present invention provides added structural support by limiting application of torque to a single rotational direction, and by providing additional material to withstand the resultant stress in that direction.

Referring now to FIG. 6, applied torque is shown to be efficiently transmitted in a single rotational direction using a high strength gear in accordance with the present invention. Additionally, it is readily apparent how the stress created by this torque is better distributed along the present gear profile than that of the prior art gear tooth. In FIG. 6, two separate but substantially identical gears 210' and 210" are shown, including teeth 218' and 218", and planar surfaces 212' and 212", respectively. As is shown, a contact surface 220' (of gear 210') makes substantial contact with contact surface 220" (of gear 210") as gear 210' is rotated in a clockwise direction (indicated by arrow 228') about axis 226', forcing gear 210" to rotate in a counter-clockwise direction (indicated by arrow 228"). As is also indicated by the arrows, torque created when rotating gear 210' is distributed along the circumferential length of tooth 218' and 218", thus allowing the additional material forming teeth 218' and 218" to absorb the stress created by the torque. This preserves the structural integrity of gear 210' and 210", increasing the strength and reliability of the gear dramatically. Of course, it can also be readily seen that rotating gear 210" in a clockwise direction about axis 226' would force gear 210' to rotate about axis 226' in a counter-clockwise direction. The same force distribution as described above would apply equally in this situation. It is also important to note the unidirectional nature of this gear configuration, wherein rotation of gear 210' about axis 226' in a counter-clockwise direction would cause surfaces 220' and 220" to disengage and no torque would be transmitted to gear 210". Likewise, if gear 210" were rotated about axis 226" in a counter-clockwise direction, surfaces 220" and 220' would disengage and no torque would be transmitted to gear 210'.

To provide a gear with the capability of transmitting torque bidirectionally, a gear profile such as depicted in FIG. 7 is used. As can be seen, the design principle described above in connection with FIGS. 4–6 has been used in constructing a bidirectional gear 230 of FIG. 7, with two substantial differences. First, gear 230 comprises substantially two separate gear profiles similar to those of gear 210, wherein gear 230 has been rendered bidirectional by reversing and stacking the separate gear profiles. Second, each of the separate gear profiles comprising gear 230 include two teeth, as opposed to the single tooth of gear 210. Gear 230 substantially comprises a first gear profile 232 and a second gear profile 244. First gear profile 232 includes a first tooth 234 and a second tooth 236, spaced apart relative to one another and radially disposed from a central aperture 238. First tooth 234 includes a first contact surface 240, and second tooth 236 includes a second contact surface 242, both contact surfaces 240 and 236 transmitting torque to a complimentary gear tooth when rotated thereagainst (as described in further detail below). Second gear profile 244 includes a third tooth 246 and a fourth tooth 248 (not shown) spaced apart relative to one another and radially disposed from central aperture 238 which extends through both gear profiles, 232 and 244. Similarly, third tooth 246 includes a third contact surface 250 (not shown) and fourth tooth 248 includes a fourth contact surface 252 (not shown), both contact surfaces being used to apply torque to a complimentary gear tooth when rotated thereagainst.

Note that teeth 234 and 236 of profile 232 are disposed to provide torque in an opposite direction in comparison to teeth 246 and 248 of gear profile 244. That is, contact surfaces 240 and 242 of teeth 234 and 236, respectively, are positioned to provide torque against complimentary teeth in contact therewith when gear 230 is rotated in a clockwise direction about an axis 254 through the center of aperture 238. In contrast, contact surfaces 250 and 252 are positioned to provide torque against complimentary teeth in contact therewith when gear 230 is rotated in a counterclockwise direction about axis 254. Thus, gear profile 232 will provide no torque when rotated in a counter-clockwise direction, and gear profile 244 will provide no torque when rotated in a clockwise direction.

Referring now to FIGS. 8a and 8b, application of the high strength limited rotation gear 230 (FIG. 7) to the synchronous operation of gearing mechanism 24 (FIG. 3) is presented in accordance with the present invention. As just described, a novel feature of mechanism 24 is that it comprises two substantially identical bidirectional gears of the type depicted in FIG. 7. That is, only a single gear design is necessary to construct the bidirectional gearing mechanism 24 of FIG. 3 and FIGS. 8a and 8b, thus greatly simplifying its manufacture and decreasing its overall production cost. Synchronous gearing mechanism 24 generally comprises first bidirectional gear 62 and second bidirectional gear 64, with a portion of their respective teeth meshed together. In FIG. 8a, it can be seen that gear 64 has simply been rotated about its central axis 65 relative to gear 62. Gear 62 includes a first gear profile 66 and a second gear profile 68 which lies beneath profile 66 in the orientation of mechanism 60. Gear 64 includes a third gear profile 70, identical to profile 66, and a fourth gear profile 72, identical to profile 68, which lies beneath profile 70 in the orientation of mechanism 60. Profile 66 includes a first tooth 74 and a second tooth 76; profile 68 includes a third tooth 78 and a fourth tooth 79 (not shown); profile 70 includes a fifth tooth 80 and a sixth tooth 82; and, profile 72 includes a seventh tooth 84 and an eighth tooth 86 (shown in phantom). FIG. 8b illustrates the relative orientations of the various features of gears 62 and 64 as they appear from the reverse view from that shown in FIG. 8a. FIG. 8b also illustrates the substantial similarities of gear profiles 72 and 68, as described above.

Referring again to FIG. 8a, the operation of mechanism 24 will be described in detail. Although either bidirectional gear 62 or 64 could be used to drive the other respective gear, let us assume for purposes of illustration that gear 64 is used to drive gear 62, as may be accomplished by inserting pin 8 or 9 (FIG. 3) or similar means into gear 64 through aperture 67. If gear 64 is rotated in a counter-clockwise direction about axis 65, the contact surface of tooth 82 will make substantial contact with the contact surface of tooth 76 of gear 62. It is, of course, assumed that gear 62 is rotatably secured about a central axis 63 such that no translational movement is possible. As tooth 82 is rotated into tooth 76, a torque is transmitted from tooth 82 to gear 62 causing it to rotate in a clockwise direction about axis 63. As can be seen by reference to the figure, this torque can only be transmitted between the gears in a limited range of motion. That is, tooth 82 and tooth 76 will make substantial contact for only a limited angular range of motion. In one embodiment of the present invention, the range of motion is approximately 20 degrees. Note that as gear 64 is rotated counter-clockwise, tooth 86 does not transmit torque to tooth 78a. If gear 64 is rotated in a clockwise direction about axis 65, the contact surface of tooth 86 will make substantial contact with the contact surface of tooth 78a. As tooth 86 is rotated into tooth 78, a torque is transmitted from tooth 86 to gear 62 causing it to rotate in a counter-clockwise direction about axis 63. Note also that when gear 64 is rotated in a clockwise direction, tooth 82 does not transmit torque to tooth 76.

One of the important advantages to the design of bidirectional mechanism 24 is that each of the component gears 62 and 64 are identical and thus easier to manufacture and are interchangeable. Another important feature is that mechanism 60 essentially comprises a synchronous gearing mechanism. That is, for a limited range of motion, rotating either gear causes the other gear to rotate a substantially identical amount. This feature can best be seen by reference to FIG. 6.

Shown in FIG. 9 is an enlarged view of synchronous gearing mechanism 24 used within keyboard 10 of the present invention. As shown, bidirectional gear 62 has an additional moment element 90 attached thereto or integrally formed therewith. Likewise, bidirectional gear 64 has an additional moment element 92 attached thereto or integrally formed therewith. Moment element 90 includes a first aperture 94 and a second aperture 96 for connecting additional elements to gear 62 of gearing mechanism 60. Likewise, moment element 92 includes a third aperture 98 and a fourth aperture 100 for connecting additional elements to gear 64 of mechanism 60.

For purposes of illustration, we will assume that each gear 62 and 64 is rotatably secured about its respective central axis. In a normal operational configuration, the teeth of the bidirectional gears are meshed as shown in the FIG. 9, and as described in relation to FIG. 8a. Thus, tooth 82 makes contact with tooth 76, and tooth 78 makes contact with tooth 86. If a force is applied to element 92 in the direction of arrow 102, gear 64 will rotate in a counter-clockwise direction about axis 65. This rotation will cause tooth 86 to transmit a torque to gear 62 via tooth 76, and cause gear 62 to rotate in a clockwise direction about axis 63. This rotation will cause member 90 to move in the direction indicated by arrow 104. Likewise, if a force is applied to moment element 90 in the direction indicated by arrow 104, gear 62 will rotate in a clockwise direction about axis 63, thereby causing tooth 78 to transmit a torque to gear 65 via tooth 86. Gear 64 will rotate in a counter-clockwise direction about axis 65, causing moment element 92 to rotate in the direction indicated by arrow 102. The mechanism will, of course maintain synchronous motion if a force is applied to either of the moment elements 90 or 92 in a direction opposite to that indicated by the arrows.

In practicing the present invention, it may be advantageous to quantize the angles of rotation available to the separate halves 12 and 16 of keyboard 10. This can be achieved by including detents (not shown), formed in a known manner and located at the distal ends of each of the moment elements 90 and 92 facing base 20 (FIG. 3). The detents can be configured to allow only specific ranges of quantized movement, such as, for example, 3 degrees per detent. Additionally, the detents can be used to ensure that a minimum amount of force per side must be applied to the front corners of the keyboard before the separate halves will rotate. The detents can prevent inadvertent rotation of the key fields during keyboard use, and also provide a tactile feel to the user during the adjustment process.

It is important to note that, although the present invention has been described in conjunction with a specific synchronous coupling means, it is contemplated that alternative synchronizing means could be used to attain the desired synchronous complementary motion of the separate halves 12 and 14. Other viable designs could include the use of linkages, belts, pressure wheels, etc. For example, and with brief reference to FIG. 4, an alternative embodiment of the present invention comprising synchronizing means employing a linkage mechanism is shown. In FIG. 10, left key field 104 and right key field 103 are pivotably mounted by pivot pins 101 and 102 to base 113. A space bar 110 is centrally mounted to base 113 and disposed between the central lower edges of key fields 104 and 103. A left link 107 is pivotably mounted to the underside of left key field 104 and extends downward to a linkage pin 114 slideably disposed within a guide slot 109 formed within base 113. Similarly, a right link 108 is pivotably mounted to the underside of right key field 103 and extends downward to linkage pin 114 disposed within guide slot 109. When a user grasps and moves either left key field 104 or right key field 103 from its first, closed position, linkage bars 107 and 108 cooperatively cause left and right key fields 103 and 104 to move to the second, open positions 104' and 103'. The subtended angle between left and right key fields 103' and 104' remains symmetrically distributed about space bar 110 by virtue of linkage pin 114 moving to its second position 114' within slot 109.

Reference is now made to FIGS. 11A and 11B, wherein an alternative embodiment of the integrated adjustable keyboard of the present invention incorporating supports for the user's hands is shown. In Figs. 11A and 11B, a pair of compliantly coupled detachable palm rests 2 and 6 is shown, one palm rest being attached to each key half 12 and 16. As shown in FIGS. 11A and 11B, palm rests 2 and 6 enable a user to gain and maintain a comfortable posture throughout the range of motion provided by movable key halves 12 and 16. The attachment means used to couple palm rests 2 and 6 to the key halves 12 and 16 must be compliant to permit a vertical displacement of each key half from the plane of the supporting base 20 as the key halves are swept through their range of motion. The compliant attachment means may comprise, for example, a vertical rib (not shown) in each key half mating to a complementary slot (not shown) in the respective palm rest 2 or 6, The important design feature of the present invention is providing an integrated keyboard, the separate components of which are synchronized such that movement of one component causes a corresponding substantially identical movement of the other component, thus ensuring a comfortable positioning of the key fields for a user. Whereas the preferred embodiment of the present invention has been described above, it is contemplated that other alternatives and modifications may become apparent to those skilled in the art after having read the above disclosure. It is therefore intended that the appended claims be interpreted as covering all such alterations and modifications as fall within the true spirit and scope of the invention.

What is claimed is:

1. An integrated adjustable data entry keyboard, comprising:.

a stationary base;

a first key field arranged in a first key half pivotably mounted to said base;

a second key field, arranged in a second key half pivotably mounted to said base; and a third key field fixedly mounted to said base synchronous coupling unit for coupling said first key field and said second key field together, said synchronous coupling unit further rotatably coupling said first key field and said second key field to said stationary base.

2. The keyboard according to claim 1, wherein said synchronous coupling means causes one of said first and second key fields to be complimentarily positioned when the other of said key fields is moved by a user.

3. The keyboard according to claim 2, wherein said first and second key fields maintain a substantially equally bisected angle relative to a said base.

4. The keyboard according to claim 3, wherein said third key field remains within the substantially equally bisected angle formed by said first and second key fields.

5. The keyboard according to claim 4, wherein said third key field comprises a space bar dimensioned to reside within the user's thumb's "strike zone" at all positions of said key fields.

6. The keyboard according to claim 5, wherein said space bar comprises a substantially rectangular key mounted to said base in first and second orthogonal dimensions, said space bar elongated in said first dimension and having first, second, third, and fourth edges, said first, second, and third edges being substantially straight, and said fourth edge comprising a radius disposed within the equally bisected angle formed by said first and second key fields.

7. The keyboard according to claim 1, wherein said synchronous coupling unit comprises a synchronous gear mechanism having a limited rotation gear profile.

8. The keyboard according to claim 1, wherein said synchronous coupling unit comprises a linkage mechanism.

9. An integrated adjustable data entry keyboard, comprising:
   a stationary base;
   a first key field arranged in a first key half pivotably mounted to said base;
   a second key field, arranged in a second key half pivotably mounted to said base;
   a third key field fixedly mounted to said base; and
   a synchronous coupling unit for coupling said first key field and said second key field together, and further for rotatably coupling said first key field and said second key field to said stationary base, said synchronous coupling unit complimentarily positioning one of said key fields relative to the base when the other of said key fields is moved by a user.

10. The keyboard according to claim 9, wherein said first and second key fields maintain a substantially equally bisected angle relative to a said base.

11. The keyboard according to claim 10, wherein said third key field remains within the substantially equally bisected angle formed by said first and second key fields.

12. The keyboard according to claim 11, wherein said third key field comprises a space bar dimensioned to reside within the user's thumb's "strike zone" at all positions of said key fields.

13. The keyboard according to claim 12, wherein said third key field comprises a space bar dimensioned to reside within the user's thumb's "strike zone" at all positions of said key fields.

14. The keyboard according to claim 13, wherein said space bar comprises a substantially rectangular key mounted to said base in first and second orthogonal dimensions, said space bar elongated in said first dimension and having first, second, third, and fourth edges, said first, second, and third edges being substantially straight, and said fourth edge comprising a radius disposed within the equally bisected angle formed by said first and second key fields.

15. The keyboard according to claim 9, wherein said synchronous coupling means comprises a synchronous gear mechanism having a limited rotation gear profile.

16. The keyboard according to claim 9, wherein said synchronous coupling unit comprises a linkage mechanism.

17. A method for arranging an integrated adjustable data entry keyboard, comprising the steps of:
   providing a stationary base;
   pivotably mounting a first key field in a first key half to said stationary base;
   pivotably mounting a second key field arranged in a second key half to said stationary base.;
   mounting a third key field to said stationary base such that said third key field remains symmetrically disposed relative to said first and second key fields,
   synchronously coupling together said first key field and said second key field, and
   rotatably coupling said first key field and said second key field to said stationary base.

* * * * *